US008833236B2

(12) United States Patent
Reyhanloo

(10) Patent No.: US 8,833,236 B2
(45) Date of Patent: Sep. 16, 2014

(54) BEVERAGE PREPARATION MACHINE AND METHOD OF OPERATING A BEVERAGE PREPARATION MACHINE

(75) Inventor: Shahryar Reyhanloo, Lohn Ammannsegg (CH)

(73) Assignee: Jura Elektroapparate AG, Niederbuchsiten (CH)

( * ) Notice: Subject to any disclaimer, the term of this patent is extended or adjusted under 35 U.S.C. 154(b) by 1513 days.

(21) Appl. No.: 11/801,726

(22) Filed: May 10, 2007

(65) Prior Publication Data

US 2007/0261565 A1    Nov. 15, 2007

(30) Foreign Application Priority Data

May 12, 2006   (EP) .................................... 06405202

(51) Int. Cl.
*A47J 31/40*      (2006.01)
*A47J 31/54*      (2006.01)

(52) U.S. Cl.
CPC ..................................... *A47J 31/545* (2013.01)
USPC ................... 99/280; 99/281; 99/282; 99/283

(58) Field of Classification Search
USPC ...................... 99/279–283; 392/498; 219/483
See application file for complete search history.

(56) References Cited

U.S. PATENT DOCUMENTS

| 4,758,709 | A | * | 7/1988 | Schiebelhuth et al. ....... 392/467 |
| 4,994,641 | A |   | 2/1991 | Schiebelhuth |
| 5,044,261 | A | * | 9/1991 | Kawazoe ......................... 99/280 |
| 5,440,972 | A |   | 8/1995 | English |
| 5,455,887 | A | * | 10/1995 | Dam ............................ 392/467 |

FOREIGN PATENT DOCUMENTS

EP            0 362 954        4/1990

* cited by examiner

*Primary Examiner* — M. Alexandra Elve
(74) *Attorney, Agent, or Firm* — Collard & Roe, P.C.

(57) ABSTRACT

A beverage preparation machine is electrically operated and has a control unit, at least one functional unit, and an electric circuit for supplying the functional unit and the control unit with current. The electric circuit has a switch for switching the current on or off, through respective first and second operations of an operating element. The switch has a first switch contact and a second switch contact, which are connected in parallel in the electric circuit. The first switch contact is brought into a closed state by the first operation of the operating element, and assumes an open state after the second operation. The control unit provides a control signal so that the second switch contact is closed after the first operation of the switch and opened after the second operation of the switch.

10 Claims, 1 Drawing Sheet

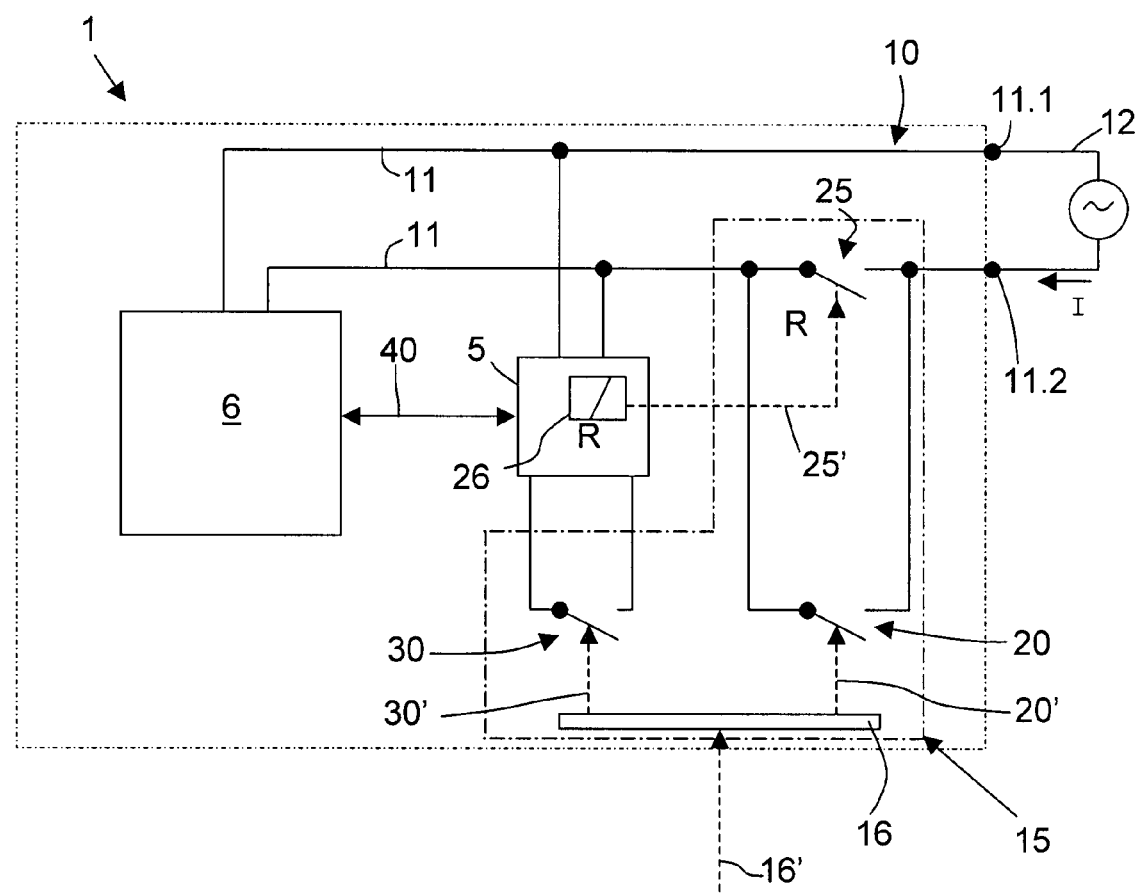

BEVERAGE PREPARATION MACHINE AND METHOD OF OPERATING A BEVERAGE PREPARATION MACHINE

BACKGROUND OF THE INVENTION

1. Field of the Invention

The invention relates to an electrical beverage preparation machine for the preparation/dispensing of a beverage, and to a method of operating such a beverage preparation machine.

2. The Prior Art

Electrical beverage preparation machines, for example for preparing/dispensing coffee, espresso, steam, hot water, hot milk, foamed milk, etc. are part of the basic equipment of many households, restaurants, factories or offices. For practical reasons, such machines are usually operated so that they are constantly connected to a main power supply, generally by a plug, even when there is no need to prepare a beverage.

So that beverage preparation machines can be constantly connected to the main power supply, but operated in such a way that minimal energy consumption is guaranteed at the same time as maximum safety, such machines are generally fitted with a switch that can be operated by a user in order to switch the machine on or off as required, i.e. to switch the (electrical) power supplying the machine on or off, or, if necessary to reduce it to a predetermined minimum value.

To date, various designs for switches intended for use in beverage preparation machines have become known.

Conventional beverage preparation machines generally have an electric circuit, connectable to a main supply, to which a control unit and one or more functional units controlled by the control unit are connected, said functional units being intended for carrying out a process performable by the machine (e.g. grinding coffee, heating water, brewing coffee, generating steam, recording machine operating data, displaying operating data and/or the operating status of the machine etc).

In many beverage preparation machines of this type, the control unit is constantly supplied with power when the electric circuit is connected to the power supply. A switch is provided to switch the power required for operating the relevant functional units on and off. In this case, when the power supply to the relevant functional unit is switched off, the machine goes into standby mode. As the control unit is constantly being supplied with power, the control unit is always ready to carry out certain functions (for example, monitoring the switch or checking certain sensors provided to monitor the operation of the machine, or monitoring buttons or interfaces that can be influenced by users in order to operate the machine).

This design has the drawback that the beverage preparation machine is constantly using power. There is also a certain safety risk, as the components of the electrical systems constantly consuming power could cause harm or damage, for example as a result of faults occurring or dangerous actions by users. It is therefore disadvantageous to leave such a beverage preparation machine unsupervised for a longer period of time if it is connected to the main supply.

In contrast to the aforementioned design, other known beverage preparation machines have two switches in their electric circuit: a first switch (main switch) which when operated can switch on or off the power for all consumers connected to the electric circuit, i.e. both for the control unit and for the relevant functional units, and a second switch which exclusively switches the power required for the relevant functional units on and off.

The aforementioned design has the advantage that the power in the electric circuit can be completely switched off through appropriate operation of the relevant switch. On the other hand, there is the disadvantage of a user confusing the available switches and not using the relevant switch for its intended purpose. For example there is a risk that by operating the first switch, a user simultaneously switches off the power for the control unit and the functional unit at a time when one of the functional units is just carrying out one of the processes intended for preparing/dispensing a beverage. The current could be switched off at a time when the functional unit is in an operating mode in which switching off the power is problematical. For example, in the case of a functional unit comprising mechanical components that move when in operation and could become jammed in an undesirable position in the event of a power outage.

SUMMARY OF THE INVENTION

The object of the present invention is to avoid the aforementioned disadvantages and to provide a beverage preparation machine and a method of operating a beverage preparation machine which make it possible to achieve the lowest possible power consumption with a high degree of safety with means that are simple for the operator to use.

This object is achieved by a beverage preparation machine that comprises an electrically operated control unit, at least one electrically operated functional unit for carrying out a process involved in the preparation/dispensing of the beverage, and an electric circuit for supplying the functional unit and the control unit with power/electric current. The electric circuit has a switch for switching the power/electric current on and/or off. The switch has a first switch contact, a second switch contact and an operating element that can be operated by a user. The switch is designed in such a way that through an initial operation of the operating element, the power/electric current is switched on and through a second operation after the initial operation, it is switched off. To switch on the power/electric current, at least one of the switch contacts must be able to assume a closed state, and to switch off the power/electric current, both switch contacts must be able to assume an open state.

The invention accomplishes this task in the following manner:

a) The first switch contact and the second switch contact are connected in parallel in the electric circuit;

b) the operating element and the first switch contact interact in such a way that the first switch contact can be brought into the closed state by the first operation of the operating element and after the second operation of the operating element, the first switch contact is brought into the open state, c) the second switch contact can be controlled with a control signal provided by the control unit in such a way that the second switch contact is brought into either the closed or open state depending on the control signal, d) sensing means are present for sensing an operation of the operating element, said sensing means interacting with the control unit in such a way that the respective operation of the operating unit is registered by the control unit, e) the control unit is designed in such a way that the control unit after the first operation, takes up an operating status in which the second switch contact assumes the closed state, and that after registering the second operation of the operating element, the second switch contact assumes the open state.

This beverage preparation machine has the advantage that the power supply to the machine can be switched on and off by operating a single operating element. A user can therefore simply and conveniently switch it on and off.

As after switching off the power supply, the two switch contacts are open, the electric circuit of the beverage preparation machine is power-off after being switched off, even if the beverage preparation machine is connected to a main supply. In this state, neither the functional units nor the control unit receive power. The beverage preparation machine can therefore be operated in a simple and an energy-saving manner.

A further advantage can be seen in the fact that operation of the operating element is monitored by the control unit and, more particularly, switching off the current is controlled by the control unit. By operating the operating element, a user can only directly influence the state (open or closed) the first switch contact assumes at that moment. If the operating element is operated for a first time in order to switch on the power, closing the first switch contact guarantees that the control unit is started up, and the control unit attains an operating state in which the current status (open or closed) of the second switch contact is exclusively controlled by the control unit. If the operating element is then operated a second time in order to switch off the power, the power in the electric circuit is not immediately switched off. The control unit only registers this operation and maintains the current flow in the electric circuit through appropriate control of the status of the second switch contact for as long as is necessary for the operation of the beverage preparation machine.

It is therefore not possible for the current flowing in the electric circuit to be switched off by a user solely by operating the switch without control by means of the control unit. This prevents the power supply to the beverage preparation machine alone being able to be switched off at an undesirable time. This guarantees a high degree of operational safety and improves user-friendliness.

In one embodiment of the beverage preparation machine according to the invention, the functional unit is controlled by the control unit, and after first operation, the functional unit can be brought from an initial state into an operational state in which the functional unit is ready to carry out the respective process. Furthermore, after second operation of the switch—possibly controlled by the control unit—the functional unit is brought into the initial state or into a predetermined rest state before the switch contact is brought into the open state, thereby switching off the power.

This embodiment has the advantage that the control unit—if the operating element is operated in order to switch off the power—can bring the functional units of the beverage preparation machine into a state in which the power can be switched off without causing further problems, and in a controlled manner. Damage to the beverage preparation machine due to switching off the power can thus be prevented by suitable specification of the control unit. In this way, the operating safety is additionally increased.

In a further embodiment of the beverage preparation machine according to the invention, the control unit is designed so that during a delay period following the second operation, the second switch contact assumes the closed state and then, on expiry of the delay period, is brought into the open state. The delay time can be predetermined on the basis of experience values or suitably determined by the control unit depending on the current operation status of beverage preparation machine. This measure also improves the operating safety and optimizes energy consumption.

BRIEF DESCRIPTION OF THE DRAWINGS

Other objects and features of the present invention will become apparent from the following detailed description considered in connection with the accompanying drawing. It is to be understood, however, that the drawing is designed as an illustration only and not as a definition of the limits of the invention.

FIG. 1 shows a beverage preparation machine in accordance with the invention.

DETAILED DESCRIPTION OF THE PREFERRED EMBODIMENT

Referring now in detail to the drawing, FIG. 1 shows a beverage preparation machine 1 for preparing/dispensing a beverage or several different beverages, for example coffee, espresso, steam, hot water, hot milk, foamed milk and/or another beverage.

Beverage preparation machine 1 comprises an electrically operated control unit 5 and an electrically operated functional unit 6 for carrying out one or more processes involved in the preparation/dispensing of the beverage in question. Control unit 5 and functional unit 6 are connected to a power supply 10 comprising an internal electric circuit 11 and an (external) main supply 12 connected to electric circuit 11 by way of connections 11.1 and 11.2. A current I is supplied to electric circuit 11 via main supply 12.

In connection with this it is assumed, for example, that functional unit 6 is equipped in such a way that it can carry out several processes when in operation, for example grinding coffee, heating water, brewing coffee, generating steam, registering machine operating data, displaying operating data and/or the operational status of the machine etc.

The aforementioned integration of several functions in functional unit 6 is obviously arbitrary and not relevant to the invention. Functional unit 6 can also be replaced with several different functional units, each of which only covering part of the functions and being separately connected to electric circuit 11.

Electric circuit 11 comprises in a parallel circuit a first switch contact 20 and a second switch contact 25, said switch contact being able to be brought into an open or closed state. Accordingly electric circuit 11 is closed and current I can pass through it when at least one of switch contacts 20 or 25 is in the closed state, and no current passes through it if both switch contacts 20 and 25 are in the open state.

Switch contacts 20 and 25 are components of a switch 15 that serves to switch current I on and off. Switch 15 also comprises an operating element 16 which a user can influence (indicated by an arrow 16' in FIG. 1) in order to operate the switch 15, namely by a first measure to switch the current I on and a second measure to switch the current I off.

The way in which operating element 16 is designed is not relevant in this connection. Within the context of the invention it is only important that operating element 16 interacts with first switch contact 20 in such a way that switch contact 20, through operation of switch 15/operating element 16, is brought into the closed state by way of the first measure and is brought into the open state by way of the second measure (the effect of operating element 16 on switch contact 20 is represented by an arrow 20' in FIG. 1).

In the present case, it is assumed that operating element 16 is in the form of a mechanically movable button which is operated by a pressure mechanically exerted on the button. However, operating element 16 can also be designed in another manner, for example in the form of a touch-sensitive element that is operated by touch, or in the form of a device that can be operated by remote control, or in the form of another interface accessible to a user.

Operating element 16 and switch contact 20 do not have to be designed as separate units. Switch contact 20 and operating element can also be designed as an integrated unit.

Operating element 16 does not act directly on second switch contact 25. The status of second switch contact 25 is controlled by control unit 5 and, more particularly, can be changed when control unit 5 is in operation, for example with the aid of a control signal provided by control unit 5.

In this case, it is assumed that a switching device 26 controllable with a control signal from control unit 5 is present which, depending on the control signal, acts on second switch contact 25 (as represented in FIG. 1 by an arrow 25'), in such a way that second switch contact 25 assumes either the open state or the closed state.

In the present case it is assumed, for example, that switch contact 25 in connection with switching device 26 is designed in the form of a relay R, whereby switching device 26 is designed as an anchor of relay R, and this anchor, controlled by control unit 5, is supplied with a current in order to bring switch contact 25 into the open or the closed state.

Second switch contact 25 can, for example, be designed as a closing contact of relay R, i.e. as a switch contact that assumes the open state when switching device 26 (anchor) is without current and assumes the closed state when switching device 26 is accordingly controlled.

Switch 15 also comprises sensing means 30 that are able to sense an operation of the switch 15/operating element 16. The sensing means 30 are connected to the control unit 5 in order to allow operations of the switch 15/operating element 16 to be registered by the control unit 5 when it is in operation.

In the present case, the sensing means 30 are in the form of a third switch contact which can assume an open state or a closed state, whereby the third switch contact, on operation of the switch 15/operating element 16, exhibits a transition from one of these states to the other state (the effect of an operation of the switch 15/operating element 16 on the sensing means 30 is shown by an arrow 30' in FIG. 1).

Depending on the design of the operating element 16, sensing means 30 can also be in the form of a sensor which is sensitive to an operation of switch 15: for example, a (suitably arranged, depending on the functional mode) pressure-sensitive and/or temperature-sensitive and/or touch sensitive sensor which on operation of the switch 15/operating element 16 exhibits a reaction that can be registered by control unit 5.

As first switch contact 20, conventional switch contacts with different characteristics are suitable: for example an impulse switch contact, i.e. a switch contact, which normally assumes the open state and, on operation of the switch 15/operating element 16, is brought into the closed state for a predetermined period of time and then back into the open state, or a permanent switch contact which is either permanently in the closed state or permanently in the open state and only exhibits a transition from one of these states into the other state by operating the switch 15/operating element 16.

Beverage preparation machine 1 also comprises a connection 40 between control unit 5 and functional unit 6. Control unit 5 can, when in operation, transmit data and/or signals via connection 40 to functional unit 6 and/or receive them from functional unit 6 in order to control functional unit 6 during operation of beverage preparation machine 1.

Beverage preparation machine 1 can be operated as follows:

If beverage preparation machine 1 is connected to main supply 12 but not switched on, first switch contact 20 and second switch contact 25 assume the open state and electric circuit 11 is therefore current-free.

To switch on beverage preparation machine 1, a user operates switch 15/operating element 16 for a first time. As a result, first switch contact 20 is closed and control unit 5 brought into an operating mode in which control unit 5 provides a control signal which causes switching device 26 to act on second switch contact 25 in such a way that this is brought into the closed state. Second switch contact 25 remains stable in the closed state insofar as switch 15/operating element 16 is not operated again.

Power supply 10 is now switched on and control unit 5 and functional unit 6 can assume normal operation.

Control unit 5 initially actively controls functional unit 6. For this purpose, control unit 5 can transmit data and/or signals via connection 40 to functional unit 6 and/or receive these from functional unit 6 in order to register the current status of functional unit 6 and possibly to cause functional unit 6 to execute certain predetermined measures.

Before beverage preparation machine 1 is ready to prepare/dispense a requested beverage, functional unit 6, controlled by control unit 5, must first be brought from an initial status (which is present on switching on the beverage preparation machine 1) into a predetermined operating mode in which functional unit 6 is ready to carry out the required processes. For example, it may be necessary to initially carry out a functional check, or automatic cleaning of pipes intended for the flow of a liquid or a beverage prepared by beverage preparation machine 1, or starting operations of a heating unit until a predetermined operating temperature is reached, or other operations.

Under normal circumstances, functional unit 5 finally attains a state in which beverage preparation machine 1 is ready to prepare/dispense a beverage and is ready to receive requests by a user (with the aid of usual means that are not shown in FIG. 1).

To switch off beverage preparation machine 1, switch 15/operating element 16 is operated a second time. First switch contact 20 is presumably designed to assume the open state. The operation of switch 15/operating element 16 is sensed by sensing means 30 and thus registered by control unit 5. Control unit 5 then provides a control signal, which causes the switching device 26 to bring second switch contact 25 into the open state. In this way, electric circuit 11 is made currentless by control unit 5.

Before control unit 5 renders electric circuit 11 currentless, control unit 5 checks the current operational status of functional unit 6. As already stated, it is possible that at the time switch 15/operating element 16 is operated by a user for a second time, the functional unit is in an operational state in which immediately switching off of the current is undesirable or could even lead to damage. Control unit 5 therefore ensures that the current in electric circuit 11 is only switched off when functional unit 6 is in the initial state or at least in a predetermined "rest state". A "rest state" in this context is taken to mean an operational state in which immediate switching off of current I is tolerable.

Accordingly control unit 5 ensures—through appropriate control of functional unit 6—that functional unit 6 goes into the initial state or into a predetermined rest state before the current I is switched off.

If necessary, control unit 5 controls second switch contact 25 in such a way that second switch contact 25 assumes the open state only after a delay time following the second operation of switch 15/operating element 16, whereby the delay time is selected so that functional unit 6 achieves the initial state or a predetermined rest state before the delay time runs out.

Control unit 5 assumes a predetermined end state before current I is switched off. This ensures that control unit 5 is always in a defined operational state before the current to electric circuit 11 is switched off.

In this context, "switch" 15 is not necessarily designed as one physical unit with a predetermined spatial structure and arranged in its entirety directly at electric circuit 11 or integrated into electric circuit 11. In this context, "switch" is also an abstract term designating a functional group comprising two switch contacts and an operating element, whereby it is assumed that the switch contacts and operating element each functionally interact in accordance with the invention. The two switch contacts and the operating element can be separate components, which can be arranged at any position spatially. For example, the operating element does not have to be mechanically located directly at electric circuit 11. The two switch contacts and the operating element can comprise several components or be parts of other components that do not necessarily have to be arranged directly at the electric circuit 11/integrated in the electric circuit 11, but can be arranged anyway in spatial terms. The latter applies, for example, to relay R constituting switch contact 25 in the case of the embodiment of FIG. 1.

Accordingly, while only a few embodiments of the present invention have been shown and described, it is obvious that many changes and modifications may be made thereunto without departing from the spirit and scope of the invention.

What is claimed is:

1. A beverage preparation machine, comprising:
   an electrically operated control unit;
   at least one electrically operated functional unit adapted for carrying out at least one process involved in the preparation or dispensing of the beverage, said functional unit being connected to the control unit;
   an electric circuit connected to a power supply for supplying the functional unit and the control unit with current (I), said electric circuit comprising a switch for switching the current on and off, said switch comprising:
   a first switch contact;
   a second switch contact connected in parallel with the first switch contact, the second switch contact being controlled by a control signal from the control unit to open and close the second switch contact; and
   an operable operating element adapted to open the first switch contact in a first operation and close the first switch contact in a second operation; and
   a sensing device for sensing the operations of the operating element, said sensing device being adapted to interact with the control unit so that each operation of the operating element is registered by the control unit;
   wherein the switch contacts are arranged such that the current is switched on when at least one of the first and second switch contacts is brought into a closed state, and the current is switched off only when both switch contacts are brought into an open state,
   wherein closing of the first switch contact by the operating element causes the control unit to send a signal and close the second switch contact, and wherein opening the first switch contact by the operating element causes the control unit to then open the second switch contact, which switches off the current.

2. A beverage preparation machine according to claim 1, wherein the functional unit is controlled by the control unit and after the first operation of the operating element, said functional unit is brought from an initial state into an operating state in which the functional unit is ready to carry out a respective process.

3. A beverage preparation machine according to claim 2, wherein the control unit is designed so that the second switch contact assumes the open state after a predetermined delay time following the second operation.

4. A beverage preparation machine according to claim 3, wherein the delay time is determined so that the functional unit is moved into the initial state or a predetermined rest state before the delay time runs out.

5. A beverage preparation machine according to claim 3, wherein the delay time is determined so that the control unit assumes a predetermined end state before the end of the delay time.

6. A beverage preparation machine according to claim 1, wherein the second switch contact is a relay closing contact.

7. A beverage preparation machine according to claim 1, wherein the first switch contact is an impulse switch contact or a permanent switch contact.

8. A beverage preparation machine according to claim 1, wherein the sensing device comprises a third switch contact that switches between an open and closed state when the operating element is operated.

9. A beverage preparation machine according to claim 1, wherein the sensing device comprises a sensor that senses an operation of the operating element.

10. A beverage preparation machine according to claim 9, wherein the sensor is pressure-sensitive, temperature-sensitive or touch sensitive.

* * * * *